(12) United States Patent
Lu et al.

(10) Patent No.: US 11,360,235 B2
(45) Date of Patent: Jun. 14, 2022

(54) MODELING METHOD AND METHOD FOR DIAGNOSING LOST CIRCULATION

(71) Applicant: China University of Petroleum (Beijing), Beijing (CN)

(72) Inventors: Yunhu Lu, Beijing (CN); Yan Jin, Beijing (CN); Mian Chen, Beijing (CN); Zejun Li, Beijing (CN); Hanqing Wang, Beijing (CN); Yang Xia, Beijing (CN); Zhou Zhou, Beijing (CN); Bing Hou, Beijing (CN); Botao Lin, Beijing (CN); Xuyang Guo, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 430 days.

(21) Appl. No.: 16/530,387

(22) Filed: Aug. 2, 2019

(65) Prior Publication Data
US 2020/0191994 A1    Jun. 18, 2020

(30) Foreign Application Priority Data
Dec. 17, 2018 (CN) .......................... 201811542293.0

(51) Int. Cl.
  *G01V 99/00*  (2009.01)
  *G06N 20/00*  (2019.01)
  *G06N 5/00*   (2006.01)

(52) U.S. Cl.
  CPC .......... *G01V 99/005* (2013.01); *G06N 5/003* (2013.01); *G06N 20/00* (2019.01)

(58) Field of Classification Search
  CPC ....... G01V 99/005; G06N 5/003; G06N 20/00
  See application file for complete search history.

(56) References Cited

U.S. PATENT DOCUMENTS

| 10,138,717 B1 | 11/2018 | Ludwig |
| 2012/0264659 A1* | 10/2012 | Kulkarni .................. C09K 8/34 507/139 |

(Continued)

FOREIGN PATENT DOCUMENTS

CN    108388921 A    8/2018

OTHER PUBLICATIONS

Zejun Li et al., Study on Intelligent Prediction for Risk Level of Lost Circulation While Drilling Based on Machine Learning, Jun. 2018, American Rock Mechanics Association, ARMA 18-105, pp. 1-8 (Year: 2018).*

(Continued)

*Primary Examiner* — Mischita L Henson
(74) *Attorney, Agent, or Firm* — Calfee Halter & Griswold LLP

(57) ABSTRACT

A modeling method is provided. The modeling method includes: extracting multiple pieces of logging data corresponding to a plurality of logging characteristic parameters at different drilling depths of a sample well, based on a logging information of the sample well; marking the different drilling depths based on a lost circulation information of the sample well to distinguish lost circulation points and non-lost circulation points; and classifying the lost circulation points and the non-lost circulation points by adopting a random forest algorithm, based on the plurality of logging characteristic parameters and the multiple pieces of marked logging data at the different drilling depths, to establish a plurality of corresponding relations between the logging characteristic parameters and a lost circulation or non-lost circulation result, so as to obtain a diagnosis model.

12 Claims, 5 Drawing Sheets

(56) References Cited

U.S. PATENT DOCUMENTS

| | | | | |
|---|---|---|---|---|
| 2016/0137903 | A1* | 5/2016 | Friedheim | C09K 8/502 507/104 |
| 2017/0314382 | A1* | 11/2017 | Torrione | E21B 21/08 |
| 2017/0364795 | A1 | 12/2017 | Anderson et al. | |
| 2018/0284758 | A1* | 10/2018 | Celia | G06Q 10/04 |

OTHER PUBLICATIONS

Li et al., Study on Intelligent Prediction for Risk Level of Lost Circulation While Drilling Based on Machine Learning, Paper from presentation for 52nd US Rock Mechanics/Geomechanics Symposium held in Seattle, Washington, USA, Jun. 17-20, 2018. 8 pages.

Yue et al., Classification of Land Use in Farming Area Based on Random Forest Algorithm, China Academic Journal Electronic Publishing House, 2016, pp. 297-303.

Kursa et al., Feature Selection with the Boruta Package, Journal of Statistical Software, Sep. 2010, vol. 36, Issue 1-13.

Verikas et al., Mining data with random forests: A survey and results of new tests, Pattern Recognition 44 (2011) pp. 330-349.

English Translation of Office Action from Chinese Application No. 201811542293.0 dated Apr. 3, 2020.

Shu Liu, et al., "Object-oriented wetland classification based on hybrid feature selection method combining with relief f, multi-objective genetic algorithm and random forest," Transactions of the Chinese Society for Agricultural Machinery, Jan. 2017, with English abstract.

Haining Wang, Research on Emotion Recognition Technology Based on Multi-channel Physiological Signal, Aug. 2016, ISBN 978-7-5667-0975-2, English abstract attached.

Mingrui Chai, et at., Data Mining Technology and Its Application in Petroleum Geology, Sep. 2019, ISBN 978-7-5576-3858-0, English abstract attached.

\* cited by examiner

MODELING METHOD AND METHOD FOR DIAGNOSING LOST CIRCULATION

CROSS REFERENCE TO RELATED APPLICATIONS

This application claims the benefit of Chinese Patent Application No. 201811542293.0, filed on Dec. 17, 2018, entitled "MODELING METHOD AND METHOD FOR DIAGNOSING LOST CIRCULATION", which is incorporated by reference as if fully set forth herein.

TECHNICAL FIELD

The present invention relates to the technical field of oil and gas drilling engineering, and specifically relates to a modeling method and a method for diagnosing lost circulation.

BACKGROUND

Lost circulation is a common complex situation that may occur in a petroleum drilling process. Lost circulation may result in serious hazards: not only can the non-production time and operation cost be increased, but also other complex accidents such as well collapse, drilling tool jamming and even blowout can occur. Lost circulation frequently happens on a loosened, depleted and karst cave/fracture development stratum and particularly on a fracture-cave development carbonatite stratum, it is easy to result in serious lost circulation on the stratums, and the lost circulation mechanism is complex.

The complex condition of lost circulation may result from the combined effect of numerous factors. Accordingly, the occurance of lost circulation is fraught with randomness and uncertainty. Areas and positions, where lost circulation is more prone to occur, may be forecast to a certain extent by using a seismic and logging method, however, the forecasting precision is not high.

SUMMARY

The present invention aims at providing a modeling method and a method for diagnosing lost circulation, by which a plurality of corresponding relations between logging characteristic parameters and a lost circulation or non-lost circulation result may be obtained, so that a diagnosis model for diagnosing lost circulation is obtained, a to-be-diagnosed well in a drilling process may be diagnosed based on the diagnosis model, and furthermore, precise early-warning for underground loss is realized.

In order to achieve the above aim, on one hand, the present invention provides a modeling method for diagnosing lost circulation, and the modeling method comprises: extracting multiple pieces of logging data corresponding to a plurality of logging characteristic parameters at different drilling depths of a sample well, based on a logging information of the sample well; marking the different drilling depths based on a lost circulation information of the sample well, to distinguish lost circulation points and non-lost circulation points; and classifying the lost circulation points and the non-lost circulation points by adopting a random forest algorithm, based on the plurality of logging characteristic parameters and the multiple pieces of marked logging data at the different drilling depths, to establish a plurality of corresponding relations between the logging characteristic parameters and a lost circulation or non-lost circulation result by employing a plurality of decision-making trees, so as to obtain the diagnosis model for diagnosing lost circulation.

Optionally, wherein the classifying of the lost circulation points and the non-lost circulation points by adopting a random forest algorithm, based on the plurality of logging characteristic parameters and the multiple pieces of marked logging data at the different drilling depths comprises the following steps: randomly selecting multiple pieces of corresponding logging data at the same or different drilling depths, based on the multiple pieces of corresponding logging data at different drilling depths to form training sets, wherein a random selection frequency is same as a number of samples at different drilling depths; gradually segmenting the training sets by adopting the plurality of logging characteristic parameters, according to a preset order; and stopping executing a segmentation action under the condition that a segmentation stopping condition is met, to obtain the decision-making trees corresponding to the training sets and furthermore realize a classification of the lost circulation points and the non-lost circulation points.

In certain embodiments, the segmentation stopping condition is a preset segmentation frequency.

In certain embodiments, the preset order is decided by a size of a Gini index of the training set under the logging data corresponding to each of the logging characteristic parameters at the different drilling depths.

In certain embodiments, the Gini index of the training set under the logging data corresponding to each of the logging characteristic parameters at the different drilling depths is $$Gini(D, A) = \frac{|D_1|}{|D|} Gini(D_1) + \frac{|D_2|}{|D|} Gini(D_2),$$

wherein $$Gini(D) = 1 - \sum_{k=1}^{K} \left(\frac{|C_k|}{|D|}\right)^2,$$

K is equal to 2, $C_1$ is a sample subset belonging to the lost circulation points in a training set D, $C_2$ is a sample subset belonging to the non-lost circulation points in the training set D, and if a logging characteristic parameter is A and a logging data corresponding to the logging characteristic parameter A at a certain drilling depth is a, the sample set D is divided into $D_1$ and $D_2$: $D_1=\{(x, y)\in D|A(x)>a\}$, $D_2=D-D_1$ by adopting the logging characteristic parameter A, wherein x is the logging characteristic parameter, and y is a mark for distinguishing the lost circulation points and the non-lost circulation points.

Optionally, further comprising: performing segmentation on the training set by adopting a logging characteristic parameter and a logging data corresponding to the logging characteristic parameter, under the condition that the Gini index of the training set under the logging data corresponding to the logging characteristic parameter at a certain drilling depth is minimum.

In certain embodiments, the ranking the importance of a plurality of logging characteristic parameters used for segmentation during establishment of the decision-making trees, based on all the training sets and the decision-making trees corresponding to the training sets.

In certain embodiments, the ranking the importance of a plurality of logging characteristic parameters used for segmentation during establishment of the decision-making trees, based on all the training sets and the decision-making trees corresponding to the training sets comprises the following steps: determining an out-of-bag error of the decision-making tree corresponding to each of the training sets, based on an out-of-bag data generated when forming each of the training sets; for each of the plurality of logging characteristic parameters for segmentation during an establishment of the decision-making tree corresponding to each of the training sets, randomly disrupting the logging data corresponding to the logging characteristic parameter in the out-of-bag data to reform a test set; redetermining a disrupted error corresponding to each of the plurality of logging characteristic parameters, based on the reformed test set corresponding to each of the plurality of logging characteristic parameters for segmentation during the establishment of the decision-making tree corresponding to each of the training sets and the decision-making tree; and determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets and the out-of-bag error of the decision-making tree, wherein the out-of-bag data are the multiple pieces of unselected logging data corresponding to each of the plurality of drilling depths.

In certain embodiments, the determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets and the out-of-bag error of the decision-making tree comprises: determining an average value of a difference value between the disrupted error corresponding to any one of logging characteristic parameters for segmentation during the establishment of the decision-making tree corresponding to each of the training sets and the out-of-bag error of the decision-making tree on all the decision-making trees; determining a standard deviation of the difference values between the disrupted errors corresponding to the logging characteristic parameters and the out-of-bag errors of all the decision-making trees, corresponding to the logging characteristic parameters on all the decision-making trees; and determining the importance of the logging characteristic parameter, based on the determined average value and standard deviation.

In certain embodiments, the processing the extracted multiple pieces of logging data to eliminate invalid data.

In certain embodiments, the logging characteristic parameters include drilling depth, drilling rate, rotating speed, hook load, weight on bit, pump pressure, torque, pump stroke, drilling fluid inflow density, drilling fluid outflow density, flow rate, outlet flow and total gas content.

Accordingly, a method for diagnosing lost circulation is also provided. The method for diagnosing lost circulation comprises: inputting logging characteristic parameters of a to-be-diagnosed well and logging data corresponding to the logging characteristic parameters into a diagnosis model established by using the above modeling method for diagnosing lost circulation; and determining a lost circulation result of the to-be-diagnosed well, according to a diagnosis result output by the diagnosis model.

Accordingly, a machine readable storage medium is also provided. An instruction is stored in the machine readable storage medium and is used for making a machine execute the above method for diagnosing lost circulation.

According to the technical scheme, the diagnosis model for diagnosing lost circulation is creatively obtained by the following steps: extracting the multiple pieces of logging data corresponding to the plurality of logging characteristic parameters at the different drilling depths of the sample well, then, marking the lost circulation points and the non-lost circulation points of the multiple pieces of logging data corresponding to each group of logging characteristic parameters including the drilling depths; and finally, classifying the lost circulation points and the non-lost circulation points of the marked logging data at the different drilling depths by adopting the random forest algorithm, to obtain the plurality of corresponding relations between the logging characteristic parameters and the lost circulation or non-lost circulation result. By using the diagnosis model, the to-be-diagnosed well in the drilling process may be diagnosed, so that the precise early-warning for underground loss is realized.

Other characteristics and advantages of the invention will be described in detail in the subsequent description.

BRIEF DESCRIPTION OF THE DRAWINGS

The accompanying drawings are intended to further illustrate embodiments of the present disclosure, the drawing are provided as one part of the description and explain the present invention together with embodiments described as below, rather than to limit the present invention. In the accompanying drawings.

FIG. 5 B is the confusion matrix of the training result of the diagnosis model provided by the embodiment of the present invention;

FIG. 5 C is the confusion matrix of the training result of the diagnosis model provided by the embodiment of the present invention;

DETAILED DESCRIPTION

The detailed description of the present invention is described in detail below in combination with accompanying drawings. It should be understood that the detailed description described herein is merely intended to illustrate and explain the present invention, rather than to limit the prevent invention.

Whether a to-be-diagnosed well generates lost circulation or not is diagnosed by adopting a seismic and logging method in the prior art, and areas and positions, where lost circulation is easy to happen, may be forecasted to a certain extent. However, the forecasting precision is not high. For the above diagnosis method, the inventors consider that diagnosis cannot be performed in the drilling process of the to-be-diagnosed well, namely diagnosis while drilling cannot be realized, because construction parameters in a drilling process are not taken into consideration. In addition, an apparent corresponding relation between each of characteristic parameters of lost circulation and a lost circulation result does not exist, so that accurate diagnosis of lost circulation based on each of the characteristic parameters cannot be realized in the prior art.

Machine learning methods have been adopted in artificial intelligence and are widely applied to all walks of life, and they allow for fuzzy unknown relations between a great number of data and a result may be found. Relevant data of drilled wells are mined and trained by utilizing a random forest algorithm in machine learning, to establish a diagnosis model for diagnosing lost circulation based on artificially-intelligent data analysis while drilling. Thus, a lost circulation result may be precisely forecast, according to the established diagnosis model in combination with data while drilling of the to-be-diagnosed well.

Figure 1:
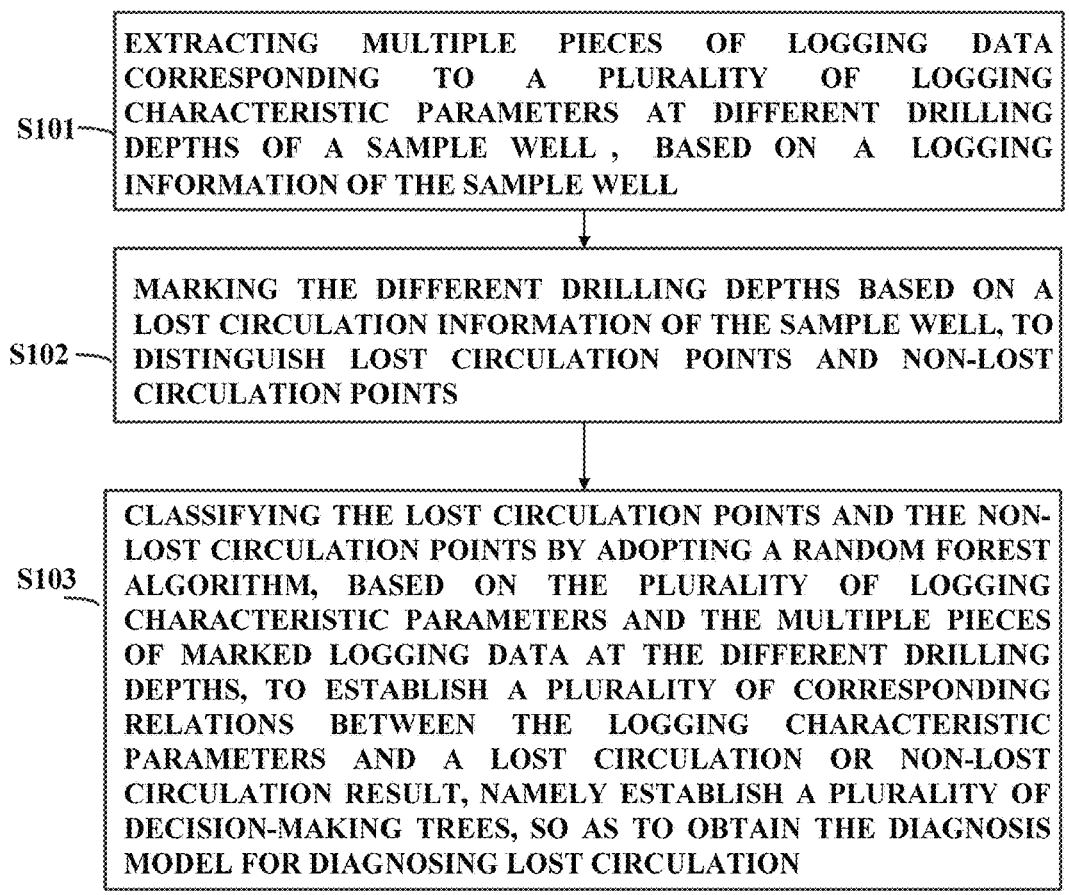
FIG. 1 is a flow diagram of a modeling method for diagnosing lost circulation, provided by an embodiment of the present invention.

FIG. 1 is a flow diagram of a modeling method for diagnosing lost circulation, provided by an embodiment of the present invention. As shown in FIG. 1, the modeling method for diagnosing lost circulation, provided by the present invention, may comprise the following steps: step S101, extracting multiple pieces of logging data corresponding to a plurality of logging characteristic parameters at different drilling depths of a sample well, based on a logging information of the sample well; step S102, marking the different drilling depths, based on a lost circulation information of the sample well, to distinguish lost circulation points and non-lost circulation points; and step S103, classifying the lost circulation points and the non-lost circulation points by adopting a random forest algorithm, based on the plurality of logging characteristic parameters and the multiple pieces of marked logging data at the different drilling depths, to establish a plurality of corresponding relations between the logging characteristic parameters and a lost circulation or non-lost circulation result, namely establish a plurality of decision-making trees, so as to obtain a diagnosis model for diagnosing lost circulation. By using the modeling method, the diagnosis model for diagnosing lost circulation may be obtained by the following steps: extracting the multiple pieces of logging data corresponding to the plurality of logging characteristic parameters at the different drilling depths of the sample well, then, marking the lost circulation points and the non-lost circulation points of the multiple pieces of logging data corresponding to each group of logging characteristic parameters including the drilling depths; and finally, classifying the lost circulation points and the non-lost circulation points of the marked logging data at the different drilling depths by adopting the random forest algorithm, to obtain the plurality of corresponding relations between the logging characteristic parameters and the lost circulation or non-lost circulation result. By using the diagnosis model, the to-be-diagnosed well in the drilling process may be diagnosed, so that the precise early-warning for underground loss is realized.

For the step S101, drilled lost circulation wells on the same block are selected as sample wells, for example, 15 sample wells are selected, operation steps executed for the 15 sample wells are completely the same, and therefore, the condition of one of the sample wells is only described as below. The multiple pieces of logging data corresponding to the plurality of logging characteristic parameters at the different drilling depths of the sample well are extracted, based on the logging information of the sample well, to form a plurality of groups of logging data corresponding to the plurality of logging characteristic parameters including the drilling depths one to one, wherein the logging characteristic parameters may include construction parameters such as the drilling depth, drilling rate, rotating speed, hook load, weight on bit, pump pressure, torque, pump stroke, drilling fluid inflow density, drilling fluid outflow density, flow rate, outlet flow and total gas content. For example, a characteristic sample matrix, taking the same logging characteristic parameter as a column (for example, the 13 logging characteristic parameters are 13 columns in total) and taking 13 pieces of logging data corresponding to the 13 logging characteristic parameters one to one at the same drilling depth as a row, may be established. The 13 pieces of logging data corresponding to one row in the present invention are called a sample.

After step S101 is executed, the modeling method may further comprise: processing the extracted multiple pieces of logging data to eliminate invalid data. Specifically, the multiple pieces of extracted logging data are preprocessed, then, abnormal data are cleared by using an outlier detection algorithm in data statistics, and missing data is deleted. Some invalid data may be deleted in the step, so that the basis is laid for establishing the real and effective diagnosis model.

Figure 2:
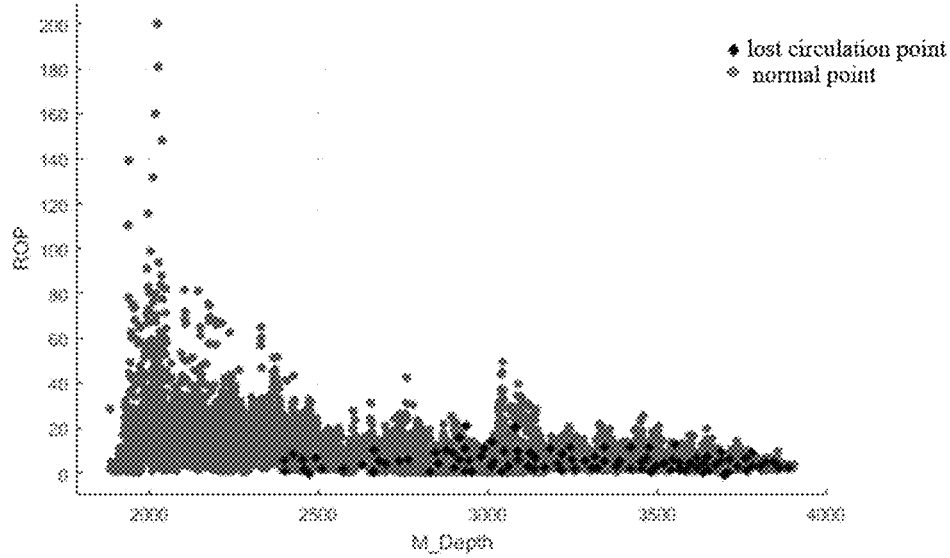
FIG. 2 is a diagram of a corresponding relation between a drilling depth and a drilling rate corresponding to the marked logging data, provided by an embodiment of the present invention.

For the step S102, the established characteristic sample matrix is marked, based on the lost circulation information of the sample well (namely, corresponding relations between lost circulation results and the different drilling depths), to form a training sample matrix with output response. Specifically, according to the drilling depths where the counted lost circulation points are located, on one hand, the established sample matrix may be marked, a column of output responses for recording the lost circulation results is added, (for example, 1 represents for a lost circulation point, and 0 represents for a non-lost circulation point); on the other hand, as shown in FIG. 2, the lost circulation results is marked in a diagram of a relation between a drilling depth and a drilling rate (a rhombus represents for the lost circulation point, and a round dot represents for the non-lost circulation point or a normal point), wherein the lost circulation information may be counted by virtue of data such as a drilling log and a final well report of the sample well.

For the step S103, classifying the lost circulation points and the non-lost circulation points by adopting a random forest algorithm, based on the plurality of logging characteristic parameters and the multiple pieces of marked logging data at the different drilling depths, comprises the following steps: randomly selecting multiple pieces of corresponding logging data at the same or different drilling depths, based on the multiple pieces of corresponding logging data at the different drilling depths to form training sets, wherein a random selection frequency is the same as a number of samples at the different drilling depths; gradually segmenting the training sets by adopting the plurality of logging characteristic parameters, according to a preset order; and stopping executing a segmentation action under the condition that a segmentation stopping condition is met, to obtain the decision-making trees corresponding to the training sets and furthermore realize a classification of the lost circulation points and the non-lost circulation points, wherein the segmentation stopping condition is a preset segmentation frequency. The overfitting of the sample may be avoided by setting the preset segmentation frequency in advance, so that the precision of the established diagnosis model is guaranteed. Or, the segmentation of a data group is stopped when the segmented data group only contains the same kinds of lost circulation points or non-lost circulation points.

Gradually segmenting the training sets by adopting the plurality of logging characteristic parameters according to a preset order may comprise: randomly selecting several of the plurality of logging characteristic parameters based on a preset rule, and segmenting the training sets according to the preset order. The preset rule may be that $\sqrt{n}$ logging characteristic parameters are randomly selected from n logging characteristic parameters ($\sqrt{n}$ is rounded plus 1 if $\sqrt{n}$ is not an integer, for example, four logging characteristic parameters are randomly selected if n is equal to 13.). Of course, the present invention is not limited to the preset rule, and other reasonable rules are also feasible. The preset order may be decided by a Gini index of the training set under the logging data corresponding to each of the logging characteristic parameters at the different drilling depths. The Gini index of the training set under the logging data corresponding to each of the logging characteristic parameters at the different drilling depths is $$Gini(D, A) = \frac{|D_1|}{|D|} Gini(D_1) + \frac{|D_2|}{|D|} Gini(D_2),$$

wherein $$Gini(D) = 1 - \sum_{k=1}^{K} \left(\frac{|C_k|}{|D|}\right)^2,$$

K is equal to 2, $C_1$ is a sample subset belonging to the lost circulation points in a training set D, $C_2$ is a sample subset belonging to the non-lost circulation points in the training set D, and if a logging characteristic parameter is A and a logging data corresponding to the logging characteristic parameter A at a certain drilling depth is a, the sample set D is divided into $D_1$ and $D_2$: $D_1=\{(x,y) \in D | A(x) > a\}$, $D_2 = D - D_1$ by adopting the logging characteristic parameter A, wherein x is the logging characteristic parameter, and y is a mark for distinguishing the lost circulation points and the non-lost circulation points.

Specifically, the training sample set with the sample amount N (the characteristic sample matrix with N rows) is replaceably and randomly selected for N times, to form the training set D with the sample amount N, wherein logging data of same or different samples exist. The decision-making trees established by the N samples, are classified by utilizing the 13 logging characteristic parameters. The steps are repeated for T times to obtain T decision-making trees, and whether the samples are the lost circulation points or not is judged, according to voting results of the T decision-making trees.

A process for generating one decision-making tree may comprise the following three steps:

step 1, several logging characteristic parameters are randomly selected from the 13 logging characteristic parameters for each segmentation, a selection amount adopts an empirical value $\sqrt{n}$ (wherein n is the amount of the characteristic parameters, namely 13), and therefore, four characteristic parameters are selected for each segmentation; for a logging characteristic parameter A, the N Gini indexes Gini(D, A) of the training set D under the N logging data corresponding to the logging characteristic parameter A are calculated, Gini(D, A) represents for the purity of the training set D split by A=a, and the minimum Gini index Gini(D, A)$_{min}$ is screened from the N Gini indexes; similarly, the minimum Gini index of the training set D under the N logging data corresponding to the other three logging characteristic parameters, is acquired by calculation and screening; and then, four minimum Gini indexes corresponding to the acquired logging characteristic parameters one to one are compared, and a minimum value is screened from the four minimum Gini indexes. The finally screened minimum value shows that the purity of data in two nodes, which are formed after the training set D is segmented by the logging characteristic parameter (corresponding to the finally screened minimum value), is the highest, namely the probability that samples within the same node belong to the lost circulation points or the non-lost circulation points is the highest.

Figure 3:
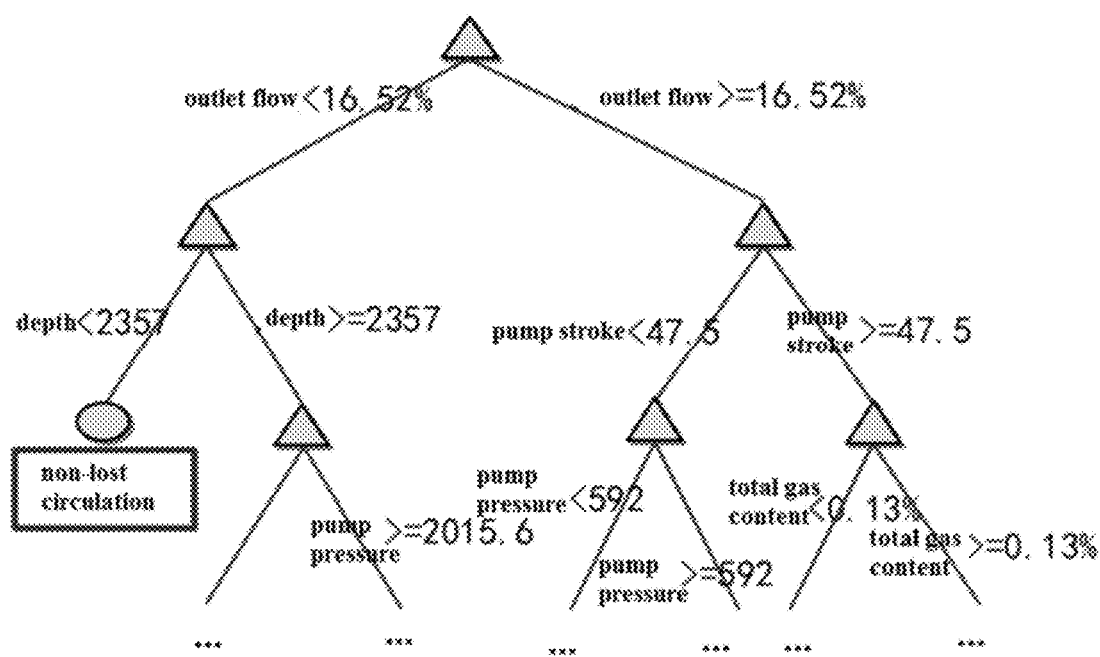
FIG. 3 is a schematic diagram of a decision-making tree generated by using the modeling method for diagnosing lost circulation, provided by an embodiment of the present invention.
Figure 4:
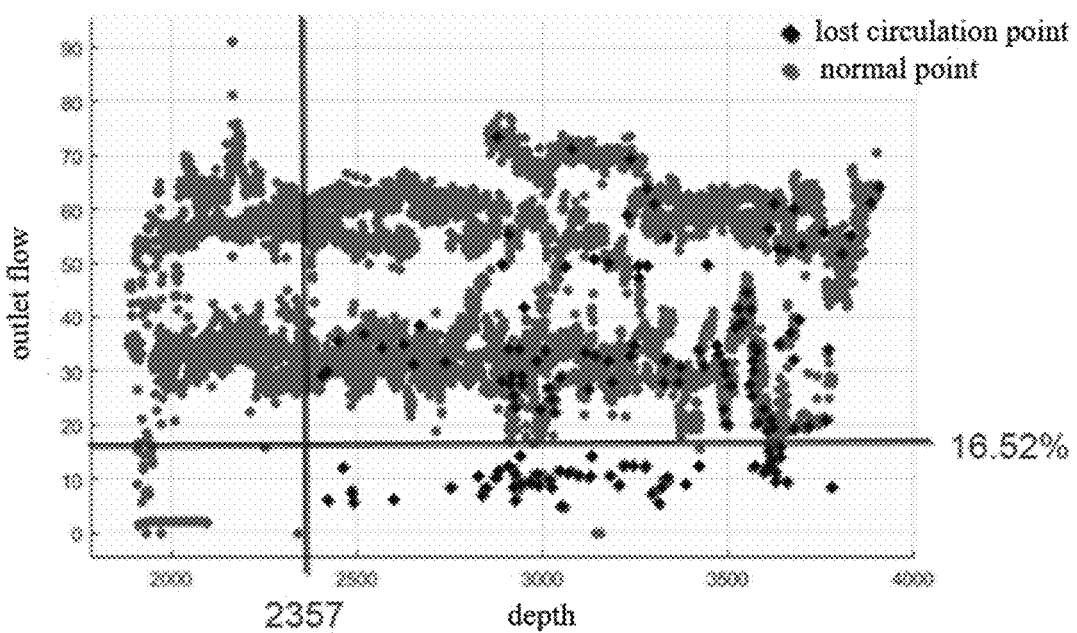
FIG. 4 is a schematic diagram of segmentation of the logging data in a process of generating the decision-making tree, provided by an embodiment of the present invention.

Step 2, the training set D is subjected to binary segmentation, according to the logging characteristic parameter corresponding to the finally screened minimum value, and two nodes are formed after segmentation. If the minimum value acquired by the calculation and screening step in the step 1, is Gini index Gini(D, L)$_{min}$ under an outlet flow L (l=16.52%), the training set D is firstly is segmented according to the outlet flow L, to form the two nodes l<16.52% and l≥16.52%, as shown in FIG. 3. After segmentation according to the outlet flow, most of the samples in the node 1 (l<16.52%) are the lost circulation points, and the samples in the node 1 (l≥16.52%) include the lost circulation points and the non-lost circulation points which are mixed together, as shown in FIG. 4.

Step 3, each (sub) node is segmented by recursively calling the steps 1 and 2 to form two novel sub-nodes, until the segmentation stopping condition is met. Novel training sets $D_1$ and $D_2$ respectively corresponding to the two segmented nodes are formed. For the two training sets $D_1$ and $D_2$, the step 1 is respectively repeated, namely the minimum Gini index Gini($D_1$, H)$_{min}$ under the drilling depth H (h=2357 m) is acquired for the node 1 (the training set $D_1$); and the minimum Gini index Gini($D_2$, S)$_{min}$ under the pump stroke S (s=47.5 SPM) (strokes per minutes) is acquired for the node 2 (the training set $D_2$). Next, the step 2 is respectively repeated, namely for the node 1, the training set $D_1$ is segmented according to the drilling depth H, to form the two sub-nodes h<2357 m and h≥b 2357 m, wherein all the samples in the sub-node h<2357 m may be determined as the non-lost circulation points based on the lost circulation information, as shown in FIG. 4, the segmentation operation of the sub-node h<2357 m is stopped; and for the node 2, the training set $D_2$ is segmented according to the pump stroke S, to form the two sub-nodes s<47.5 and s≥47.5. Then, the steps 1 and 2 are repeated for the other three sub-nodes, and each of the sub-nodes is gradually segmented until the segmentation stopping condition is met, so that the decision-making tree corresponding to the training set D may be obtained, and furthermore, the classification of the lost circulation points and the non-lost circulation points may be realized.

The T decision-making trees may be obtained by respectively repeating the steps 1-3 for the T training sets, so that the diagnosis model for diagnosing lost circulation is obtained. For logging-while-drilling data of the to-be-diagnosed well, whether the samples are the lost circulation points or not may be determined by the voting results of the T decision-making trees (1 represents for the lost circulation points, and 0 represents for the non-lost circulation points).

Figure 5A:
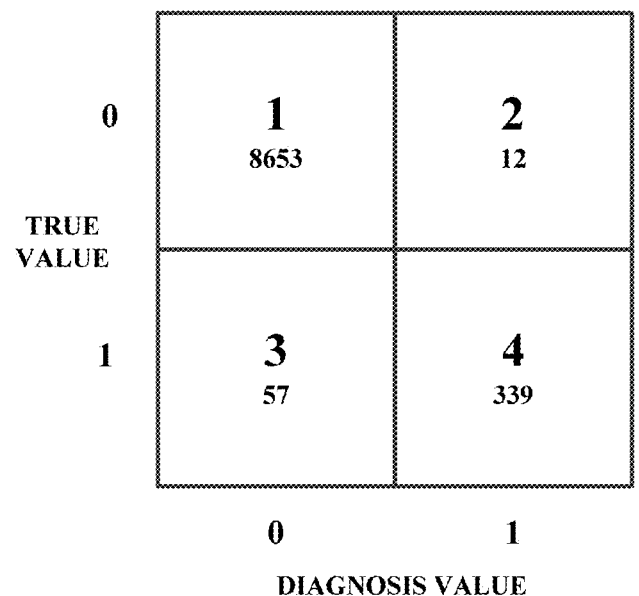
FIG. 5 A is a confusion matrix of a training result of a diagnosis model provided by an embodiment of the present invention.
Figure 5B:
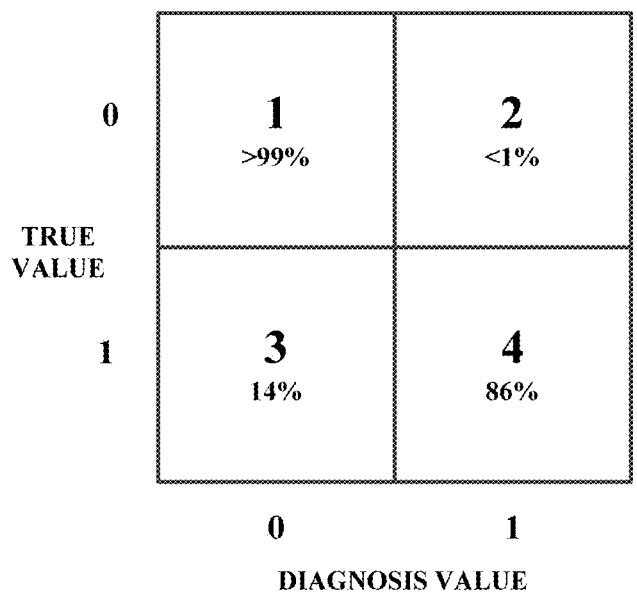
Figure 5C:
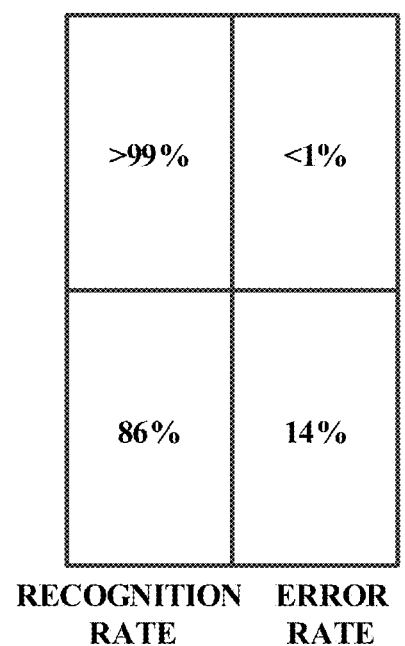

In order to avoid excessive segmentation (i.e., overfitting) in a segmentation process, the accuracy of the diagnosis model is evaluated below by adopting 5-fold cross validation, as shown in FIGS. 5A, 5B, and 5C. Areas 1 and 4 in FIG. 5A respectively represent for sample amounts of the non-lost circulation points and the lost circulation points which are correctly diagnosed, and areas 2 and 3 respectively represent for sample amounts of the non-lost circulation points and the lost circulation points which are misdiagnosed; areas 1 and 4 in FIG. 5B respectively represent for percentages of the non-lost circulation points and the lost circulation points which are correctly diagnosed, and areas 2 and 3 respectively represent for percentages of the non-lost circulation points and the lost circulation points which are misdiagnosed; and areas 1 and 3 in the FIG. 5C respectively represent for recognition rates of the non-lost circulation points and the lost circulation points, and areas 2 and 4 respectively represent for error rates of the non-lost circulation points and the lost circulation points. Specifically, for a training set including 9061 samples, output results of 8992 samples are correct, and output results of 69 samples are incorrect; and in 396 lost circulation samples, output results of 339 samples are correct, output results of 57 samples are incorrect, and the recognition rate of the lost circulation points is 86%. Thus, it can be seen that the accuracy rate of the diagnosis model established by using the modeling method for diagnosing lost circulation, provided by the present invention, is relatively high.

The modeling method for diagnosing lost circulation, provided by the present invention, may further comprise: ranking the importance of a plurality of logging characteristic parameters used for segmentation during establishment of the decision-making trees, based on all the training sets and the decision-making trees corresponding to the training sets. Ranking the importance of a plurality of logging characteristic parameters used for segmentation during establishment of the decision-making trees, based on all the training sets and the decision-making trees corresponding to the training sets comprises the following steps: determining an out-of-bag error of the decision-making tree corresponding to each of the training sets, based on an out-of-bag data generated when forming each of the training sets; for each of the plurality of logging characteristic parameters for segmentation during a establishment of the decision-making tree corresponding to each of the training sets, randomly disrupting the logging data corresponding to the logging characteristic parameter in the out-of-bag data to reform a test set; redetermining a disrupted error corresponding to each of the plurality of logging characteristic parameters, based on the reformed test set corresponding to each of the plurality of logging characteristic parameters for segmentation during the establishment of the decision-making tree corresponding to each of the training sets, and the decision-making tree; and determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets, and the out-of-bag error of the decision-making tree, wherein the out-of-bag data are the multiple pieces of unselected logging data corresponding to each of the plurality of drilling depths.

Wherein determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets, and the out-of-bag error of the decision-making tree comprises: based on a difference value between the disrupted error corresponding to any one of logging characteristic parameters for segmentation during the establishment of the decision-making tree corresponding to each of the training sets, and the out-of-bag error of the decision-making tree, determining an average value of the difference value corresponding to the logging characteristic parameter on all the decision-making trees; based on the difference values between the disrupted errors corresponding to the logging characteristic parameters and the out-of-bag errors of all the decision-making trees, determining a standard deviation of the difference values corresponding to the logging characteristic parameters on all the decision-making trees; and determining the importance of the logging characteristic parameter, based on the determined average value and standard deviation.

Specifically, the process of ranking the importance of the plurality of logging characteristic parameters comprises the following three steps:

Step 1, for the decision-making tree t (t=1, . . . , T), unselected samples (out-of-bag samples) and selected logging characteristic parameters $X_j$ for segmentation and generation of a decision-making tree t when the training set for generating the decision-making tree t is generated by random sampling are determined, if 13 logging characteristic parameters are adopted for segmentation in a process of generating the decision-making tree t, j is equal to 1, 2, 3 . . . , 12, 13; logging data of the out-of-bag samples are input to the decision-making tree t to obtain voting results; and the amount of samples which are diagnosed incorrectly is divided by the amount of the out-of-bag samples, to obtain an out-of-bag error $e_t$ of the decision-making tree t.

Step 2, for each logging characteristic parameter $X_j$, the logging data corresponding to the logging characteristic parameter $X_j$ in the out-of-bag samples are randomly disrupted. For example, for the drilling depth H, the logging data corresponding to the drillin g depth H in the out-of-bag data are $h_1$ and $h_2$ if the out-of-bag samples are a sample 1 and a sample 2, and it is possible that the sample 1 (including $h_2$ and the logging data corresponding to the other logging characteristic parameters kept to be constant, for example, $l_1$ and $s_1$ respectively corresponding to an outlet flow L and a pump stroke 5) and the sample 2 (including $h_1$ and the logging data corresponding to the other logging characteristic parameters kept to be constant, for example, $l_2$ and $s_2$ respectively corresponding to the outlet flow L and the pump stroke S) are included after the logging data are randomly disrupted. A disrupted error $e_{tj}$ of the decision-making tree t is retested, based on the logging characteristic parameter $X_j$ and the randomly disrupted logging data corresponding to the logging characteristic parameter $X_j$. Logging characteristic parameters not used for segmentation when the decision-making tree t is generated, are not disrupted, and therefore, the out-of-bag error corresponding to the logging characteristic parameter is same as the disrupted error.

Figure 6:
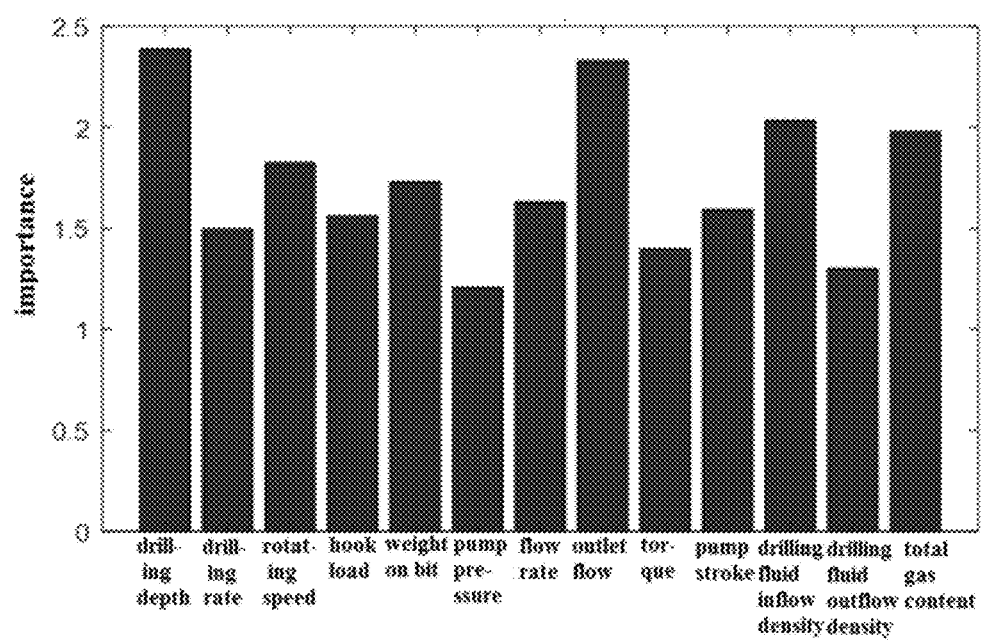
FIG. 6 is a diagram of an importance evaluation result of logging characteristic parameters, provided by an embodiment of the present invention.

Step 3, a difference $d_{tj}=e_{tj}-e_t$ between the disrupted error of the decision-making tree and the out-of-bag error, as well as an average value $d_j$ and a standard difference $\sigma_j$ of the difference $d_{tj}$ of the all decision-making trees are calculated for each of the 13 logging characteristic parameters; and then, the importance index $d_j/\sigma_j$ of the logging characteristic parameter $X_j$ may be determined according to the average value $d_j$ and the standard difference $\sigma_j$. It is indicated that the larger the numerical value of the importance index $d_j/\sigma_j$ is, the more important the logging characteristic parameter $X_j$ for diagnosing a lost circulation result is. It may be seen from an importance result of the logging characteristic parameters, as shown in FIG. 6, the outlet flow, the drilling depth, drilling fluid inflow density, rotating speed and total gas content are relatively important for diagnosing the lost circulation result, and importance levels of the outlet flow, the drilling depth, the drilling fluid inflow density, the rotating speed and the total gas content are gradually reduced.

Therefore, the interpretability of the diagnosis model established by using the modeling method for diagnosing lost circulation, provided by the present invention, is relatively better, and some explanations may also be given in combination with engineering practices. In addition, an input characteristic importance rank may be obtained without artificially screening the logging characteristic parameters.

In a word, the diagnosis model for diagnosing lost circulation is creatively obtained by the following steps: extracting the multiple pieces of logging data corresponding to the plurality of logging characteristic parameters at the different drilling depths of the sample well, then, marking the lost circulation points and the non-lost circulation points of the multiple pieces of logging data corresponding to each group of logging characteristic parameters including the drilling depths; and finally, classifying the lost circulation points and the non-lost circulation points of the marked logging data at the different drilling depths by adopting the random forest algorithm, to obtain the plurality of corresponding relations between the logging characteristic parameters and the lost circulation or non-lost circulation result. By using the diagnosis model, the to-be-diagnosed well in the drilling process may be diagnosed, so that the precise early-warning for underground loss is realized.

Figure 8:
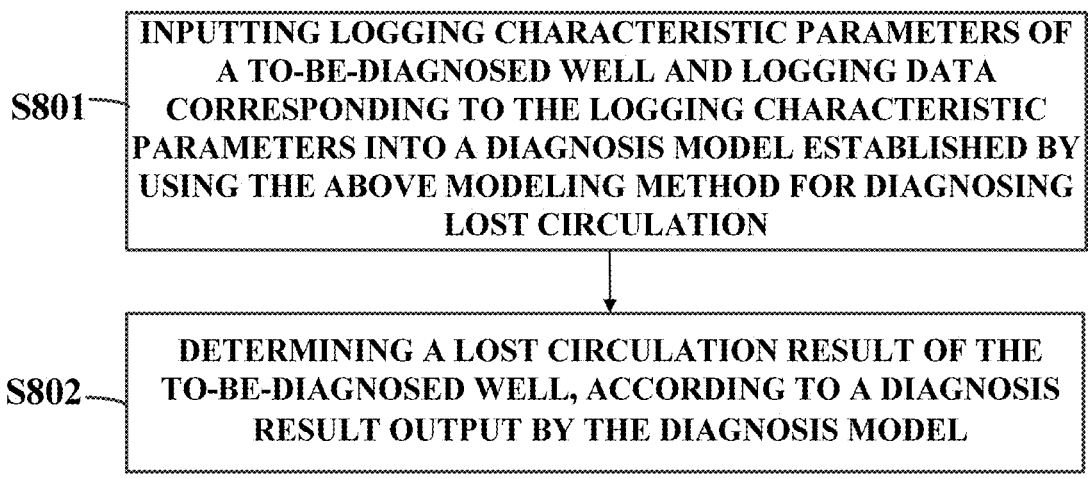
FIG. 8 is a flow diagram of a method for diagnosing lost circulation provided by an embodiment of the present invention.

Correspondingly, as shown in FIG. 8, the present invention further provides a method for diagnosing lost circulation, the method may comprise the following steps: step S801, inputting the logging characteristic parameters of a to-be-diagnosed well and logging data corresponding to the logging characteristic parameters into the diagnosis model established by using the above modeling method for diagnosing lost circulation; and determining a lost circulation result of the to-be-diagnosed well according to a diagnosis result output by the diagnosis model.

Specifically, the logging data of the to-be-diagnosed well may be organized into a standard format, namely a matrix containing 13 characteristic parameters, according to the order of the logging characteristic parameters in the above process of establishing the diagnosis model; the matrix is input into the diagnosis model established by using the above modeling method for diagnosing lost circulation; whether the to-be-diagnosed well may generate lost circulation at a certain drilling depth or not may be judged according to an output result (for example, 1 represents for the lost circulation points, and 0 represents for the non-lost circulation points). Of course, the diagnosis model comprises the plurality of decision-making trees, so that judgment may be realized according to the probability that the output result is 1 or 0. For example, if the probability that the output result is 1 is higher, it is indicated that the drilling depth is the lost circulation point, or else, it is indicated that the drilling depth is the non-lost circulation point. However, the to-be-diagnosed well is determined to have a lost circulation risk under the condition that the lost circulation point exists; and the to-be-diagnosed well is determined not to have the lost circulation risk under the condition that no lost circulation points exist.

Figure 7:
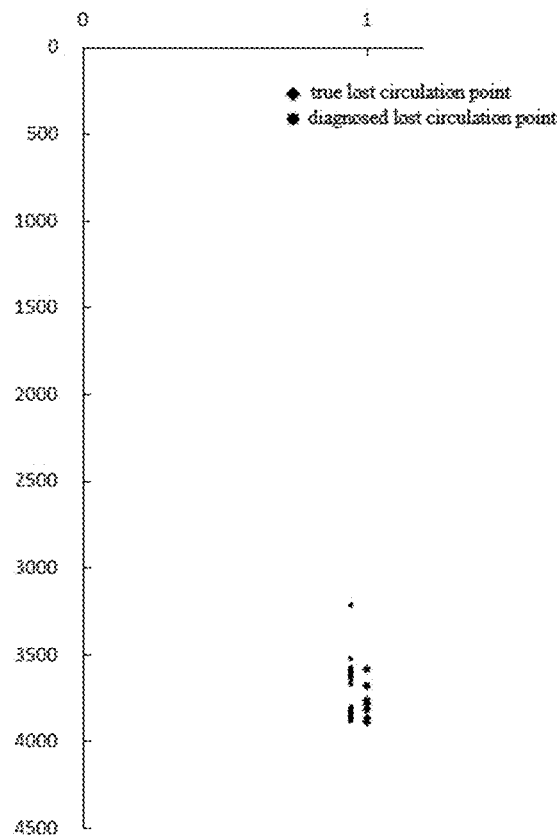
FIG. 7 is a diagram of a test result of the accuracy of diagnosis model based on a to-be-diagnosed well, provided by an embodiment of the present invention.

The accuracy of the diagnosis model is tested by selecting a to-be-diagnosed well (not taking part in machine learning), and a diagnosis result obtained based on the diagnosis model and an actual loss condition determined by the statistic lost circulation information are compared as shown in FIG. 7. In order to obviously display a contrast result, data corresponding to the diagnosis result is wholly moved leftwards, and (seen from a vertical coordinate of the shown data) most of lost circulation positions may be diagnosed by the diagnosis result. Therefore, the lost circulation diagnosis method is capable of intelligently diagnosing the loss condition of the to-be-diagnosed well, and the accuracy of diagnosis result is very high, so that the accurate early-warning for underground loss is realized.

Correspondingly, the present invention further provides a machine readable storage medium in which an instruction is stored, and the instruction may be used for making a machine execute the above method for diagnosing lost circulation.

Preferred embodiments of the present invention are described in detail above in combination with accompanying drawings, however, but the present invention is not limited to specific details in the embodiments, various simple variations for the technical solution of the present invention may be realized within the scope of technical concept of the present invention, and the simple variations fall into the scope of the present invention.

In addition, it should be noted that specific technical characteristics described in the detailed embodiments may be combined in any proper ways under the condition that no conflicts are generated. Various possible combination ways are not described separately again in order to avoid unnecessary repetition.

In addition, various different embodiments of the present invention may be arbitrarily combined and should also be regarded as contents disclosed by the present invention as long as the thought of the present invention is obeyed.

We claim:

1. A modeling method for diagnosing lost circulation, comprising:
  extracting multiple pieces of logging data corresponding to a plurality of logging characteristic parameters at different drilling depths of a sample well, based on logging information of the sample well;
  marking the different drilling depths based on a lost circulation information of the sample well, to distinguish lost circulation points and non-lost circulation points; and classifying the lost circulation points and the non-lost circulation points by adopting a random forest algorithm, based on the plurality of logging characteristic parameters and the multiple pieces of marked logging data at the different drilling depths, to establish a plurality of corresponding relations between the logging characteristic parameters and a lost circulation or non-lost circulation result by employing a plurality of decision-making trees, so as to obtain a diagnosis model for diagnosing lost circulation, wherein the classifying the lost circulation points and the non-lost circulation points by adopting a random forest algorithm, based on the plurality of logging characteristic parameters and the multiple pieces of marked logging data at the different drilling depths comprises the following steps:

randomly selecting multiple pieces of corresponding logging data at the same or different drilling depths, based on the multiple pieces of corresponding logging data at different drilling depths to form training sets, wherein a random selection frequency is same as a number of samples at different drilling depths;

gradually segmenting the training sets by adopting the plurality of logging characteristic parameters, according to a preset order; and stopping executing a segmentation action under the condition that a segmentation stopping condition is met, to obtain the decision-making trees corresponding to the training sets and furthermore realize a classification of the lost circulation points and the non-lost circulation points.

2. The modeling method for diagnosing lost circulation according to claim 1, wherein the segmentation stopping condition is a preset segmentation frequency.

3. The modeling method for diagnosing lost circulation according to claim 1, wherein the preset order is decided by a size of a Gini index of the training set under the logging data corresponding to each of the logging characteristic parameters at the different drilling depths.

4. The modeling method for diagnosing lost circulation according to claim 3, wherein the Gini index of the training set under the logging data corresponding to each of the logging characteristic parameters at the different drilling depths is $$Gini(D, A) = \frac{|D_1|}{|D|}Gini(D_1) + \frac{|D_2|}{|D|}Gini(D_2),$$

wherein $$Gini(D) = 1 - \sum_{k=1}^{K}\left(\frac{|C_k|}{|D|}\right)^2,$$

K is equal to 2, $C_1$ is a sample subset belonging to the lost circulation points in a training set D, $C_2$ is a sample subset belonging to the non-lost circulation points in the training set D, and if a logging characteristic parameter is A and a logging data corresponding to the logging characteristic parameter A at a certain drilling depth is a, the sample set D is divided into $D_1$ and $D_2$: $D_1=\{(x, y)\in D|A(x)>a\}$, $D_2=D-D_1$ by adopting the logging characteristic parameter A, wherein x is the logging characteristic parameter, and y is a mark for distinguishing the lost circulation points and the non-lost circulation points.

5. The modeling method for diagnosing lost circulation according to claim 3, further comprising:

performing segmentation on the training set by adopting a logging characteristic parameter and a logging data corresponding to the logging characteristic parameter, under the condition that the Gini index of the training set under the logging data corresponding to the logging characteristic parameter at a certain drilling depth is minimum.

6. The modeling method for diagnosing lost circulation according to claim 1, further comprising:

ranking the importance of a plurality of logging characteristic parameters used for segmentation during establishment of the decision-making trees, based on all the training sets and the decision-making trees corresponding to the training sets.

7. The modeling method for diagnosing lost circulation according to claim 6, wherein the ranking the importance of a plurality of logging characteristic parameters used for segmentation during establishment of the decision-making trees, based on all the training sets and the decision-making trees corresponding to the training sets comprises the following steps:

determining an out-of-bag error of the decision-making tree corresponding to each of the training sets, based on an out-of-bag data generated when forming each of the training sets;

for each of the plurality of logging characteristic parameters for segmentation during an establishment of the decision-making tree corresponding to each of the training sets, randomly disrupting the logging data corresponding to the logging characteristic parameter in the out-of-bag data to reform a test set;

redetermining a disrupted error corresponding to each of the plurality of logging characteristic parameters, based on the reformed test set corresponding to each of the plurality of logging characteristic parameters for segmentation during the establishment of the decision-making tree corresponding to each of the training sets and the decision-making tree; and determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets and the out-of-bag error of the decision-making tree, wherein the out-of-bag data are the multiple pieces of unselected logging data corresponding to each of the plurality of drilling depths.

8. The modeling method for diagnosing lost circulation according to claim 7, wherein the determining the importance of each of the plurality of logging characteristic parameters for segmentation during the establishment of the decision-making tree, based on the disrupted error corresponding to each of the plurality of logging characteristic parameters for segmentation during the establishment of the decision-making tree corresponding to each of the training sets and the out-of-bag error of the decision-making tree comprises:

determining an average value of a difference value between the disrupted error corresponding to any one of logging characteristic parameters for segmentation during the establishment of the decision-making tree corresponding to each of the training sets and the out-of-bag error of the decision-making tree on all the decision-making trees;

determining a standard deviation of the difference values between the disrupted errors corresponding to the logging characteristic parameters and the out-of-bag errors of all the decision-making trees, corresponding to the logging characteristic parameters on all the decision-making trees; and determining the importance of the logging characteristic parameter, based on the determined average value and standard deviation.

9. The modeling method for diagnosing lost circulation according to claim 1, further comprising: processing the extracted multiple pieces of logging data to eliminate invalid data.

10. The modeling method for diagnosing lost circulation according to claim 1, wherein the logging characteristic parameters include drilling depth, drilling rate, rotating speed, hook load, weight on bit, pump pressure, torque, pump stroke, drilling fluid inflow density, drilling fluid outflow density, flow rate, outlet flow and total gas content.

11. A method for diagnosing lost circulation, comprising:
inputting logging characteristic parameters of a to-be-diagnosed well and logging data corresponding to the logging characteristic parameters into a diagnosis model established by using the modeling method for diagnosing lost circulation according to claim 1; and determining a lost circulation result of the to-be-diagnosed well, according to a diagnosis result output by the diagnosis model.

12. A non-transitory machine readable storage medium comprising an instruction stored in the non-transitory machine readable storage medium and the instruction is used for making a machine execute the method for diagnosing lost circulation according to claim 11.

\* \* \* \* \*